United States Patent
Serbetci et al.

(10) Patent No.: US 10,644,759 B2
(45) Date of Patent: May 5, 2020

(54) MOBILE COMMUNICATION SYSTEM, METHOD OF ARRANGING DATA SEGMENTS IN SEQUENCES AND METHOD OF TRANSMITTING AN ACKNOWLEDGEMENT

(71) Applicants: Koninklijke KPN N.V., Rotterdam (NL); Nederlandse Organisatie Voor Toegepast-Natuurwetenschappelijk Onderzoek TNO, The Hague (NL); University of Twente, Enschede (NL)

(72) Inventors: Berksan Serbetci, Enschede (NL); Jasper Goseling, Enschede (NL); Ljupco Jorguseski, Rijswijk (NL)

(73) Assignees: KONINKLIJKE KPN N.V., Rotterdam (NL); NEDERLANDSE ORGANISATIE VOOR TOEGEPAST-NATUURWETENSCHAPPELIJK ONDERZOEK TNO, The Hague (NL); UNIVERSITY OF TWENTE, Enschede (NL)

( * ) Notice: Subject to any disclaimer, the term of this patent is extended or adjusted under 35 U.S.C. 154(b) by 0 days.

(21) Appl. No.: 15/379,147

(22) Filed: Dec. 14, 2016

(65) Prior Publication Data
US 2017/0187427 A1 Jun. 29, 2017

(30) Foreign Application Priority Data
Dec. 29, 2015 (EP) ..................... 15202976

(51) Int. Cl.
H04B 7/024 (2017.01)
H04W 84/04 (2009.01)

(52) U.S. Cl.
CPC ............ *H04B 7/024* (2013.01); *H04W 84/042* (2013.01)

(58) Field of Classification Search
CPC ... H04W 84/042; H04W 84/04; H04W 84/02; H04B 7/04
(Continued)

(56) References Cited

U.S. PATENT DOCUMENTS

| | | | |
|---|---|---|---|
| 2009/0003300 A1* | 1/2009 | Wang | H04B 7/022 370/340 |
| 2011/0268007 A1* | 11/2011 | Barany | H04B 7/024 370/312 |

(Continued)

OTHER PUBLICATIONS

El Banna Ahmad A. Aziz et al., "Low complexity adaptive detection of distributed SFBC in open-loop CoMP". Jun. 23, 2014, IEEE, pp. 1-5.*

(Continued)

*Primary Examiner* — Kwang B Yao
*Assistant Examiner* — Syed M Bokhari
(74) *Attorney, Agent, or Firm* — Hamilton, Brook, Smith & Reynolds, P.C.

(57) ABSTRACT

The invention relates to a mobile communication system. The mobile communication system includes a first base station configured to transmit at least part of a first data set of data segments arranged in a first sequence to a user terminal, and a second base station configured to transmit at least part of the first data set of data segments arranged in a second sequence to the user terminal, the second sequence of the first data set being an inverse of the first sequence of the first data set. The invention also relates to a coordination component, base station and user terminal for use in this system and to a method of arranging data segments in sequences performed by the coordination component. The invention further relates to a method of transmitting an acknowledgement, performed by the base station or by the user terminal.

8 Claims, 6 Drawing Sheets

(58) Field of Classification Search
USPC .................... 370/312, 329, 338, 340, 331
See application file for complete search history.

(56) References Cited

U.S. PATENT DOCUMENTS

| | | | | |
|---|---|---|---|---|
| 2012/0163357 A1* | 6/2012 | Won | .................. | H04L 1/1671 370/338 |
| 2014/0254551 A1* | 9/2014 | Chaponniere | ....... | H04W 36/026 370/331 |
| 2016/0113003 A1* | 4/2016 | Lyons | ................ | H04B 7/0452 375/267 |

OTHER PUBLICATIONS

El Banna Ahmad A. Aziz et al., "Low complexity adaptive detection of distributed SFBC in open-loop CoMP". Jun. 23, 2014, IEEE, pp. 1-5 (Year: 2014).*

Partial Search Report for Application No. EP15202976.5, entitled "Mobile Communication System, Method of Arranging Data Segments in Sequences and Method of Transmitting an Acknowledgement," consisting of 3 pages, dated Jun. 22, 2016.

Extended Search Report for Application No. EP15202976.5, entitled "Mobile Communication System, Method of Arranging Data Segments in Sequences and Method of Transmitting an Acknowledgement," consisting of 8 pages, dated Jun. 22, 2016.

El-Banna, et al., Low Complexity Adaptive Detection of Distributed SFBC in Open-Loop CoMP, *IEEE Symposium on Computers and Communications (ISCC)*, *IEEE*, pp. 1-5 (2014).

3rd Generation Partnership Project; Technical Specification Group Radio Access Network; Coordinated multi-point operation for LTE physical layer aspects (Release 11) Technical Report, 3GPP TR 36.819 V11.2.0 (2013).

Alamouti, S. M., "A Simple Transmit Diversity Technique for Wireless Communications," IEEE Journal on Select Areas in Communications, vol. 16, No. 8, pp. 1451-1458 (1998).

* cited by examiner

MOBILE COMMUNICATION SYSTEM, METHOD OF ARRANGING DATA SEGMENTS IN SEQUENCES AND METHOD OF TRANSMITTING AN ACKNOWLEDGEMENT

RELATED APPLICATION

This application claims priority under 35 U.S.C. § 119 or 365 to European Application No. 15202976.5, filed Dec. 29, 2015. The entire teachings of the above application are incorporated herein by reference.

TECHNICAL FIELD

The invention relates to a mobile communication system and to a coordination component, a base station and a user terminal for use in such a system.

The invention further relates to a method of arranging data segments in sequences and a method of transmitting an acknowledgment.

The invention also relates to a computer program product enabling a computer system to perform any of such methods.

BACKGROUND

Technical Specification 3GPP TR 36.819 v11.2.0 describes coordinated multi-point operation (CoMP) for LTE physical layer aspects and discloses various techniques with the common aspect that there is a dynamic coordination and/or reception at the user terminal from multiple geographically separated or collocated base stations (called evolved NodeBs in LTE). One of these techniques is termed 'dynamic cell selection' wherein at a particular point in time data is transmitted only from a single transmission node and there is a process to dynamically select which of the transmission nodes transmits the data. For example, selecting a transmission node with the, at the particular point in time, best conditions on the wireless interface allows to increase the rate at which data packets may be delivered at the user device, compared to a single-point mode of operation. It is a drawback of these techniques that they require either a significant amount of control and coordination between base stations or, if this inter-base station control or coordination does not exist, that they may involve redundant transmissions to user terminals.

SUMMARY

It is a first object of the invention to provide a mobile communication system, in which the amount of control and coordination between base stations and the amount of redundant transmissions to user terminals is limited.

It is a second object of the invention to provide a method of arranging data segments in sequences, which limits the amount of control and coordination between base stations and the amount of redundant transmissions to user terminals.

It is a third object of the invention to provide a method of transmitting an acknowledgment, which limits the amount of control and coordination between base stations and the amount of redundant transmissions to user terminals.

According to the invention, the first object is realized in that the mobile communication system comprises a first base station configured to transmit at least part of a first data set of data segments arranged in a first sequence to a user terminal and a second base station configured to transmit at least part of said first data set of data segments arranged in a second sequence to said user terminal, said second sequence of said first data set being an inverse of said first sequence of said first data set. A data segment may be an IP, PDCP, RLC or MAC packet, for example.

The mobile communication system of the invention allows a user terminal to start receiving data segments from another base station whenever this is beneficial, e.g. when it is able to receive this other base station better and/or the other base station has a lower load than the base station it is currently receiving data segments from, while limiting the amount of control and coordination between base stations and the amount of redundant transmissions to user terminals when doing so. If the first base station and the second base station would transmit the first data set in the same sequence, coordination between the base stations would be required every time the user terminal would switch from an old base station to a new base station. Without such coordination, the new base station would transmit data to the user terminal that the user terminal might have already received from the old base station. By configuring the first base station and the second base station such that the sequence in which the first data set is transmitted by the respective base stations is inverse, the new base station can resume transmission at the point it previously left off with limited redundant transmissions. Coordination/synchronization between base stations is only needed when the user terminal has received all data segments of a data set.

For each of said first base station and said second base station, said base station may be configured to detect that a user terminal has not received a previous transmission by said base station of at least part of a data segment and to retransmit said at least a part of said data segment to said user terminal upon said detection. Although the invention can be used without retransmissions, e.g. for real-time traffic sent over UDP/IP in LTE unacknowledged mode, the invention is most beneficial when it is used with retransmissions of unsuccessful transmissions. The base station can detect whether the user terminal has not received the previous transmission with the help of positive or negative acknowledgments, for example.

Said mobile communication system may further comprise a third base station configured to transmit at least part of a second data set of data segments arranged in a first sequence to said user terminal, said second data set comprising different data segments than said first data set. This limits the amount of control and coordination between base stations and the amount of redundant transmissions to user terminals more than if all three base stations would transmit data segments from the first data set. If all three base stations would transmit data segments from the first data set, then the third base station should preferably transmit the first data set in a third sequence, the third sequence being different from the first and the second sequence of the first data set, e.g. having an arbitrarily chosen order. However, this is still less beneficial than the third base station transmitting the at least part of the second data set.

One of said first base station and said second base station may be configured to transmit at least part of said second data set of data segments arranged in a second sequence after said user terminal has acknowledged receipt of said first data set, said first sequence of said second data set being an inverse of said second sequence of said second data set. This results in one of the first and second base stations assisting the third base station transmit the second data set in order to reduce the probability of the user terminal receiving a third data set before the second data set, which would cause a latency increase.

The other one of said first base station and said second base station may be configured to transmit at least part of a third data set of data segments after said user terminal has acknowledged receipt of said first data set, said third data set comprising different data segments than said first data set and said second data set. This limits the amount of control and coordination between base stations and the amount of redundant transmissions to user terminals more than if all three base stations would transmit data segments from the second data set. If all three base stations would transmit data segments from the second data set, then the other one of the first base station and the second base should preferably transmit the second data set in a third sequence, the third sequence being different from the first and the second sequence of the second data set, e.g. having an arbitrarily chosen order. However, this is still less beneficial than the other one of the first base station and the second base transmitting the at least part of the third data set.

According to the invention, the second object is realized in that the method of arranging data segments in sequences comprises the steps of arranging a first data set of data segments in a first sequence, arranging said first data set in a second sequence, said second sequence of said first data set being an inverse of said first sequence of said first data set, and using a data transmitter to transmit coordination information to at least one base station, said coordination information comprising at least one of a request to transmit said first data set in said first sequence to a user terminal and a request to transmit said first data set in said second sequence to said user terminal. This method may be performed by a base station or by a different coordination component, for example.

According to the invention, the third object is realized in that the method of transmitting an acknowledgment comprises the steps of using a data receiver to receive a first one of a plurality of data segments of a data set from a base station and/or a data segment acknowledgement acknowledging receipt of said first one of said plurality of data segments by a user terminal, using said data receiver to receive a last one of said plurality of data segments of said data set from said base station and/or a data set acknowledgement acknowledging receipt of said data set by said user terminal, and using a data transmitter to transmit to a further base station a data set acknowledgment acknowledging receipt of said data set by said user terminal, while not transmitting to said further base station a data segment acknowledgment acknowledging receipt of said first one of said plurality of data segments by said user terminal. This method may be performed by a base station or by a user terminal, for example. By not transmitting to the base station an acknowledgment of receipt of the first one of the plurality of data segments by the user terminal, the amount of transmitted acknowledgments is significantly reduced compared to a method in which these acknowledgements are transmitted. On the other hand, transmitting to a further base station an acknowledgment of receipt of the data set by the user terminal in combination with the inverse ordering is sufficient to limit the amount of redundant transmissions to user terminals.

In a fourth aspect of the invention, a coordination component for use in the mobile communication system of the invention comprises a data transmitter and a processor configured to arrange a first data set of data segments in a first sequence, to arrange said first data set of data segments in a second sequence, said second sequence of said first data set being an inverse of said first sequence of said first data set, and to use said data transmitter to transmit coordination information to at least one base station, said coordination information comprising at least one of a request to transmit said first data set in said first sequence to a user terminal and a request to transmit said first data set in said second sequence to said user terminal. The coordination component may be (part of) one of the two base stations or may be (part of) a different device. When the coordination component is (part of) a different device, the data transmitter is preferably used to send coordination information to both base stations, a first coordination information being sent to one of the base stations comprising a request to transmit the first data set in the first sequence to a user terminal and a second coordination information being sent to the other of the base stations comprising a request to transmit the first data set in the second sequence to the user terminal.

The coordination component determines which segments are arranged in the first data set (and in further data sets). Preferably, a data set comprises an amount of data segments that is neither too large nor too small. If this amount is smaller, base stations will be finished sooner delivering the segment and latency is reduced. If the amount is larger, the signaling overhead is smaller. The amount is therefore a trade-off between these two advantages. The coordination information may indicate the sequence of the data segments in terms of existing packet sequence numbers already included in the overhead (e.g. header or trailer), e.g. of an Internet Protocol datagram.

Said processor may be further configured to arrange a second data set of data segments in a first sequence, said second data set comprising different data segments than said first data set, and to use said data transmitter to transmit further coordination information to a further base station, said further coordination information comprising one of a request to transmit said first data set in said first sequence to said user terminal, a request to transmit said first data set in said second sequence to said user terminal, and a request to transmit said second data set in said first sequence to said user terminal. Which data set the coordination component requests the further base station to transmit, and in which sequence, depends on which data set(s) the coordination component requested the first base station and/or the second base station to transmit and if relevant, in which sequence. Furthermore, if the coordination component is (part of) a certain base station, this depends on which data set this certain base station is going to transmit and if relevant, in which sequence.

Said processor may be further configured to arrange said second data set in a second sequence, said second sequence of said second data set being an inverse of said first sequence of said second data set, and said coordination information may further comprise a request to transmit said second data set in said second sequence to said user terminal after said first data set has been transmitted.

Said processor may be further configured to arrange a third data set of data segments in a first sequence and said coordination information may further comprise a request to transmit said third data set in said first sequence to said user terminal after said first data set has been transmitted, said third data set comprising different data segments than said first data set and said second data set.

Said processor may further be configured to determine that a further base station is available for transmitting a data set of data segments to said user terminal, to determine whether a certain data set exists that is currently being transmitted by only one other base station, and to use said data transmitter to transmit further coordination information to said further base station, said further coordination information comprising a request to transmit said certain data set to said user terminal if said certain data set is determined to exist and a request to transmit a new data set to said user terminal if said certain data set is determined not to exist. The further base station may be a new base station that is not currently transmitting data segments to said user terminal or may be a base station that has finished transmitting another data set of data segments to said user terminal.

Said processor may further be configured to determine a certain sequence in which said other base station is transmitting said certain data set if said certain data set is determined to exist and said further coordination information may comprise a request to transmit said certain data set in an inverse of said certain sequence if said certain data set is determined to exist.

In a fifth aspect of the invention, a base station for use in the mobile communication system of the invention comprises a data receiver, a data transmitter, and a processor configured to use said data transmitter to transmit a data set comprising a plurality of data segments to a user terminal, to use said data receiver to receive from said user terminal a data segment acknowledgment acknowledging receipt of a first one of said plurality of data segments, to use said data receiver to receive from said user terminal a data set acknowledgement acknowledging receipt of said data set and to use said data transmitter to inform a further base station of said data set acknowledgment while not informing said further base station of said data segment acknowledgement. The base station may inform the further base station directly or via one or more other devices.

In a sixth aspect of the invention, a user terminal for use in the mobile communication system of the invention comprises a data receiver, a data transmitter, and a processor configured to use said data receiver to receive a first one of a plurality of data segments of a data set from a base station, to use said data transmitter to transmit a data segment acknowledgment acknowledging receipt of said first one of said plurality of data segments to said base station, to use said data receiver to receive a last one of said plurality of data segments of said data set from said base station, to use said data transmitter to transmit a data set acknowledgement acknowledging receipt of said data set to said base station and to a further base station and not to transmit said data segment acknowledgment to said further base station.

Said processor may be further configured to use said data receiver to switch to receiving data segments from said further base station instead of said base station in dependence on at least one of reception conditions and load conditions with respect to said base station and said further base station. This dynamic cell selection technique is used to reduce the number of failed transmissions due to poor channel conditions and/or delays due to heavily loaded base stations. The user terminal may switch base stations several times or more.

Moreover, one or more computer programs for carrying out the methods described herein, as well as a non-transitory computer readable storage-medium storing one or more of the computer programs are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations comprising: arranging a first data set of data segments in a first sequence, arranging said first data set in a second sequence, said second sequence of said first data set being an inverse of said first sequence of said first data set, and using a data transmitter to transmit coordination information to at least one base station, said coordination information comprising at least one of a request to transmit said first data set in said first sequence to a user terminal and a request to transmit said first data set in said second sequence to said user terminal.

A non-transitory computer-readable storage medium stores at least one software code portion, the software code portion, when executed or processed by a computer, being configured to perform executable operations comprising: using a data receiver to receive a first one of a plurality of data segments of a data set from a base station and/or a data segment acknowledgement acknowledging receipt of said first one of said plurality of data segments by a user terminal, using said data receiver to receive a last one of said plurality of data segments of said data set from said base station and/or a data set acknowledgement acknowledging receipt of said data set by said user terminal, and using a data transmitter to transmit to a further base station a data set acknowledgment acknowledging receipt of said data set by said user terminal, while not transmitting to said further base station a data segment acknowledgment acknowledging receipt of said first one of said plurality of data segments by said user terminal.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

Figure 1:
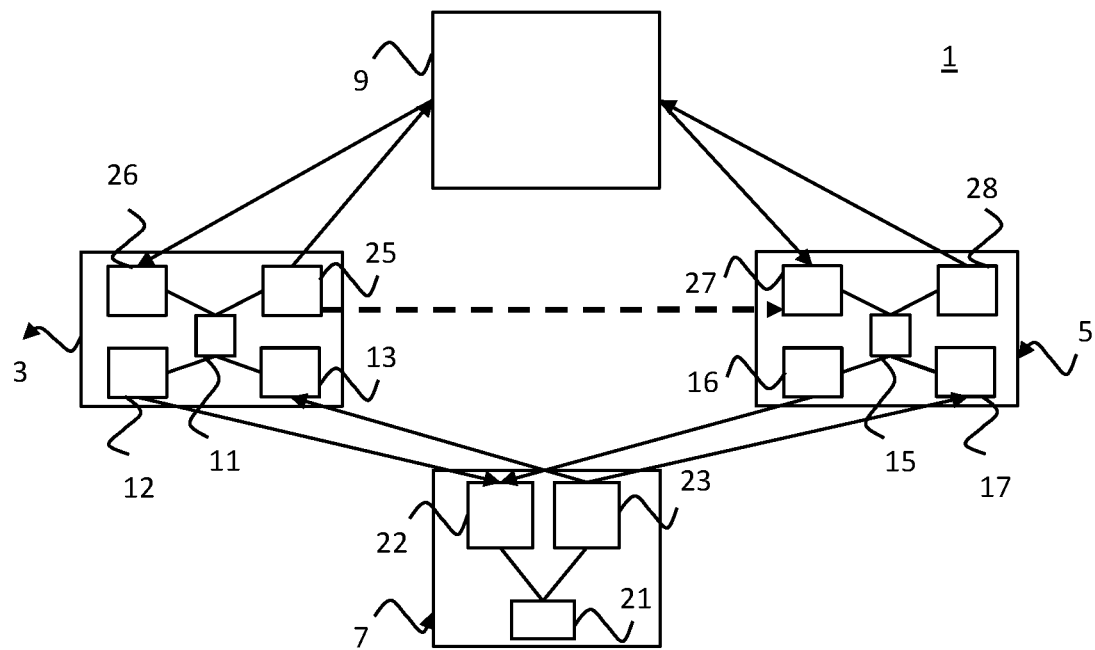
FIG. 1 is a block diagram of a first embodiment of the mobile communication system of the invention.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

The mobile communication system 1 of the invention comprises a first base station 3 and a second base station 5, see FIG. 1. The first base station 3 is configured to transmit at least part of a first data set of data segments arranged in a first sequence to a user terminal 7. The second base station 5 is configured to transmit at least part of the first data set of data segments arranged in a second sequence to the user terminal 7. The second sequence of the first data set is an inverse of the first sequence of the first data set.

The mobile communication system 1 may be, may comprise or may be part of an GPRS, UMTS, CDMA or LTE communication network, for example. In the embodiment shown in FIG. 1, the mobile communication system 1 is an LTE communication network in which a Serving Gateway (S-GW) 9 is present. The Serving Gateway 9 is typically connected to a PDN Gateway (P-GW). The invention can be used in conjunction with LTE's Coordinated multipoint (CoMP) transmission techniques.

In the embodiment shown in FIG. 1, the first base station 3 comprises a data receiver 13, data transmitters 12 and 25 and a processor 11. The processor 11 is configured to use the data transmitter 12 to transmit a data set comprising a plurality of data segments to a user terminal 7, to use the data receiver 13 to receive from the user terminal 7 a data segment acknowledgment acknowledging receipt of a first one of the plurality of data segments, to use the data receiver 13 to receive from the user terminal 7 a data set acknowledgement acknowledging receipt of the data set and to use the data transmitter 25 to inform the second base station 5 of the data set acknowledgment while not informing the second base station 5 of the data segment acknowledgement. The first base station 3 further comprises a data receiver 26 for receiving data from the Serving Gateway 9.

The second base station 5 comprises a data receiver 17, data transmitters 16 and 28 and a processor 15. The processor 15 is configured to use the data transmitter 16 to transmit a data set comprising a plurality of data segments to a user terminal 7, to use the data receiver 17 to receive from the user terminal 7 a data segment acknowledgment acknowledging receipt of a first one of the plurality of data segments, to use the data receiver 17 to receive from the user terminal 7 a data set acknowledgement acknowledging receipt of the data set and to use the data transmitter 28 to inform the first base station 3 of the data set acknowledgment while not informing the first base station 3 of the data segment acknowledgement. The second base station 5 further comprises a data receiver 27 for receiving data from the Serving Gateway 9.

When the user terminal 7 does not inform both the first base station 3 and the second base station 5 of the data set acknowledgment, whichever base station receives the data set acknowledgement from the user terminal 7 informs the other base station(s). This communication may be direct between base stations, but may also be routed via the Serving Gateway 9, for example.

The user terminal 7 comprises a data receiver 22, a data transmitter 23, and a processor 21. The processor 21 is configured to use the data receiver 22 to receive a first one of a plurality of data segments of a data set from the first base station 3, to use the data transmitter 23 to transmit a data segment acknowledgment acknowledging receipt of the first one of the plurality of data segments to the first base station 3, to use the data receiver 22 to receive a last one of the plurality of data segments of the data set from the first base station 3, to use the data transmitter 23 to transmit a data set acknowledgement acknowledging receipt of the data set to the first base station 3 and to the second base station 5 and not to transmit the data segment acknowledgment to the second base station 5.

In an embodiment, the processor 21 of the user terminal 7 is further configured to use the data receiver 22 to switch to receiving data segments from the second base station 5 instead of the first base station 3 in dependence on at least one of reception conditions and load conditions with respect to the first base station 3 and the second base station 5. In LTE, this technique is referred to as "Dynamic Cell Selection".

The data segments may be arranged in the first and second sequences by a coordination component. In the embodiment shown in FIG. 1, the first base station 3 is the coordination component. In this embodiment, the processor 11 of the base station is configured to arrange a first data set of data segments in a first sequence, to arrange the first data set of data segments in a second sequence, the second sequence of the first data set being an inverse of the first sequence of the first data set, and to use the data transmitter 25 to transmit coordination information to the second base station 5, the coordination information comprising at least one of a request to transmit the first data set in the first sequence to a user terminal 7 and a request to transmit the first data set in the second sequence to the user terminal 7.

The transmission of the coordination information is shown in FIG. 1 with a dotted line between the data transmitter 25 of the first base station 3 and the data receiver 27 of the second base station 5. This communication may be direct between base stations, but may also be routed via the Serving Gateway 9, for example. The second base station 5 preferably receives data segments from the Serving Gateway 9 (even when the coordination information is exchanged directly between base stations), as shown in FIG. 1, but may also receive the data segments from the first base station 3, for example. In LTE, such a first base station 3 may be referred to as a so-called 'anchor' eNB and the user data and coordination signalling is exchanged via the X2 interface between the 'anchor' eNB and the cooperating eNBs (e.g. the second base station 5). Preferably, the cooperating eNBs are able to provide feedback to the 'anchor' eNB.

Figure 2:
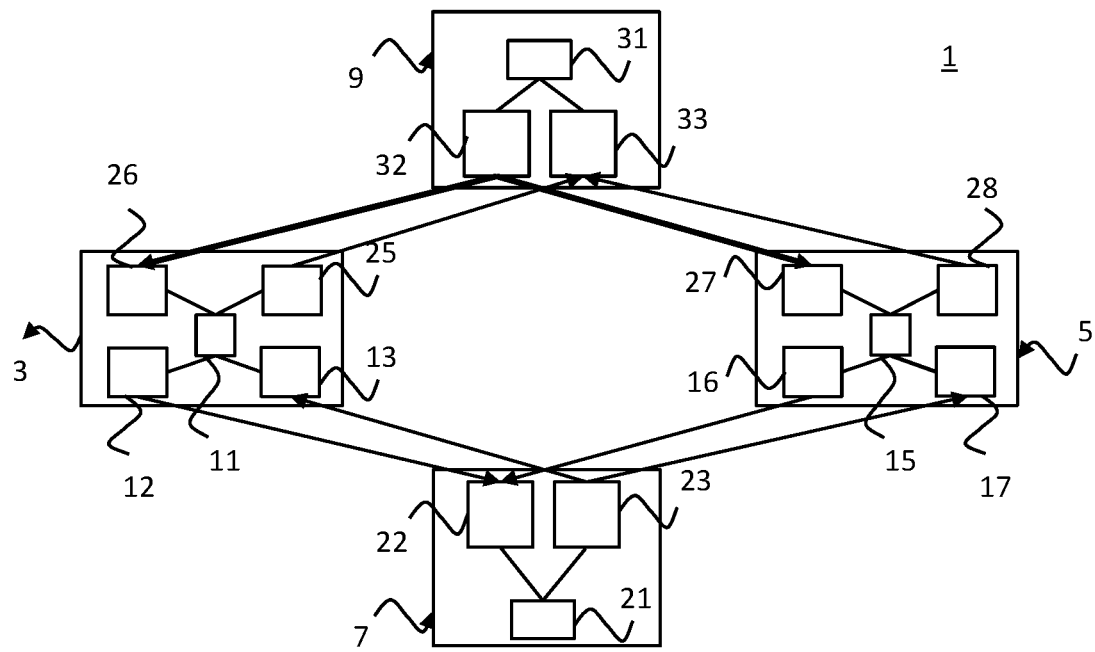
FIG. 2 is a block diagram of a second embodiment of the mobile communication system of the invention.

In the embodiment shown in FIG. 2, the Serving Gateway (S-GW) 9 is the coordination component, which coordinates the downlink transmissions from the multiple points/base stations. In this embodiment, a processor 31 of the Serving Gateway is configured to arrange a first data set of data segments in a first sequence, to arrange the first data set of data segments in a second sequence, the second sequence of the first data set being an inverse of the first sequence of the first data set, and to use a data transmitter 32 to transmit coordination information to (the data receiver 26 of) the first base station 3 and (the data receiver 27 of) the second base station 5, the coordination information for one of the base stations comprising a request to transmit the first data set in the first sequence to a user terminal 7 and the coordination information for the other of the base stations comprising a request to transmit the first data set in the second sequence to the user terminal 7. The Serving Gateway 9 further comprises a data receiver 33 for receiving data segments from the first base station 3 and from the second base station 5.

In an embodiment, the first base station 3 is configured to detect that a user terminal 7 has not received a previous transmission by the first base station 3 of at least part of a data segment and to retransmit the at least a part of the data segment to the user terminal 7 upon this detection and the second base station 5 is configured to detect that a user terminal 7 has not received a previous transmission by the second base station 5 of at least part of a data segment and to retransmit the at least a part of the data segment to the user terminal 7 upon this detection. In LTE, this can be achieved in the "Acknowledged" mode, for example.

Figure 3:
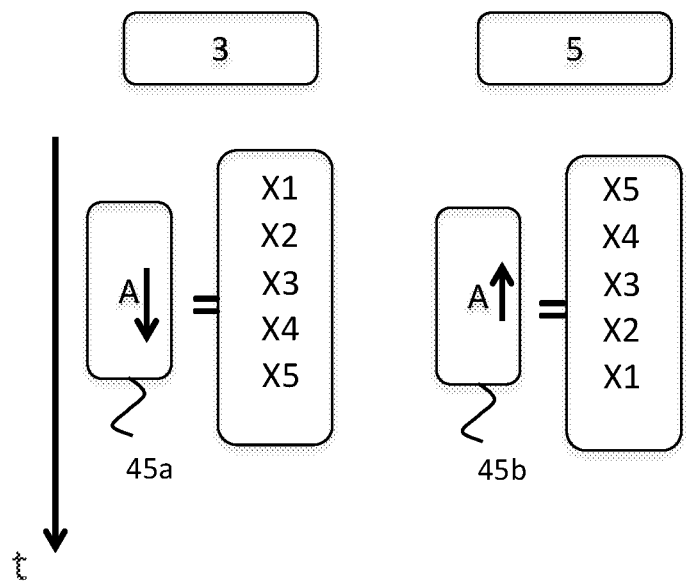
FIG. 3 illustrates a first example of sequences determined in a mobile communication system comprising two base stations.

FIG. 3 illustrates an example of sequences determined in a mobile communication system comprising the first base station 3 and the second base station 5. In this example, the first base station 3 and the second base station 5 are both transmitting to the user terminal 7. The data segments of the first data set (A) are scheduled to be transmitted by the two base stations in inverted sequence. The first base station 3 is scheduled to transmit the first data set (A) in normal order in sequence 45*a*: X1, X2, X3, X4 and then X5, and the second base station 5 is scheduled to transmit the first data set (A) in reverse order in sequence 45*b*: X5, X4, X3, X2 and then X1. Coordination between the base stations only needs to occur when user terminal 7 has received all data segments of the first data set (A).

In this example, it is assumed that both base stations take turns transmitting with the same probability, so that the user terminal 7 will have received all data segments of the first data set (A) while receiving data segment X3 from the first base station 3 or from the second base station 5. This is because the user terminal 7 will already have received data segments X1 and X2 from the first base station 3 and data segments X5 and X4 from the second base station 5. Then when the user terminal 7 has received data segment X3, it will possess all data segments of the first data set (A) and will send a data set acknowledgement to the base station it is currently receiving data segments from. Only then does this base station need to inform the other base station about the completed transmission of the data set, in order to discard the remaining data segments of the data set, i.e. switch to another data set.

The fact that both base stations have same probability of transmission is not restrictive. Independently of how many data segments are transmitted by each base station, there is only an exchange of signalling between the base stations (e.g. through the LTE X2 interface) when there is a data set acknowledgement and not when there is a data segment acknowledgement. In the worst case, there will be one redundant transmission: the user terminal 7 acknowledges receipt of the first data set (A) to the base station from which it received the last data segment, e.g. the first base station 3, but in the next timeslot switches to the other base station, e.g. the second base station 5, which transmits one more data segment before it gets informed by the first base station 3 about the data set acknowledgement.

Figure 4:
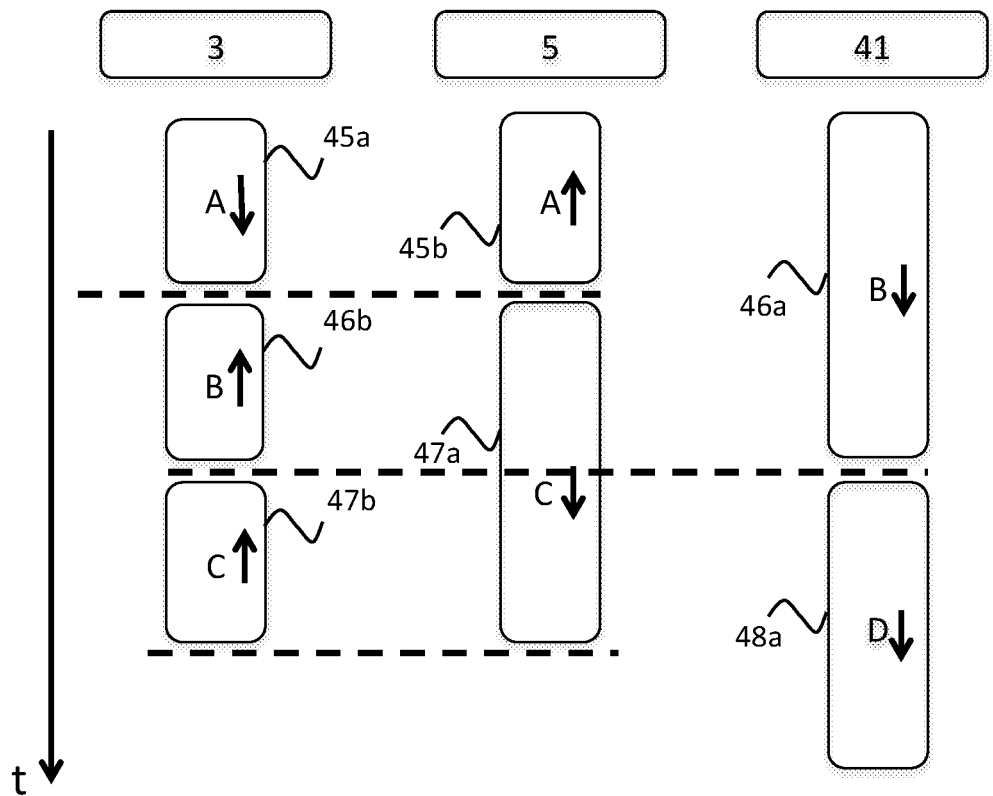
FIG. 4 illustrates a second example of sequences determined in a mobile communication system comprising three base stations.

FIG. 4 illustrates an example of sequences determined in a mobile communication system comprising a third base station 41 in addition to the first base station 3 and the second base station 5. The third base station 41 is configured to transmit at least part of a second data set (B) of data segments arranged in a first sequence 46*a* to the user terminal 7, the second data set (B) comprising different data segments than the first data set (A). So while the first base station 3 and the second base station 5 are both transmitting the first data set (A), the third base station 41 is transmitting a different data set: the second data set (B).

When the first base station 3 is the coordination component, as shown in FIG. 1, the processor 11 is further configured to arrange a second data set (B) of data segments in a first sequence 46*a*, the second data set (B) comprising different data segments than the first data set (A), and to use the data transmitter 25 to transmit further coordination information to the third base station 41, the further coordination information comprising a request to transmit the second data set (B) in the first sequence 46*a* to the user terminal 7. When the Serving Gateway 9 is the coordination component, as shown in FIG. 2, the processor 31 is further configured to arrange a second data set (B) of data segments in a first sequence 46*a*, the second data set (B) comprising different data segments than the first data set (A), and to use the data transmitter 32 to transmit further coordination information to the third base station 41, the further coordination information comprising a request to transmit the second data set in the first sequence 46*a* to the user terminal 7.

In the example of FIG. 4, the first base station 3 is configured to transmit at least part of a second data set (B) of data segments arranged in a second sequence 46*b* after the user terminal 7 has acknowledged receipt of the first data set (A), the first sequence 46*a* of the second data set (B) being an inverse of the second sequence 46*b* of the second data set (B). The second data set (B) may comprise data segments Y1, Y2, Y3, Y4, Y5 and Y6, for example. In this case, the first sequence 46*a* of the second data set (B) may be Y2, Y3, Y1, Y5, Y6 and Y4 and the second sequence 46*b* of the second data set (B) may be Y4, Y6, Y5, Y1, Y3 and Y2, for example.

When the first base station 3 is the coordination component, as shown in FIG. 1, the processor 11 is further configured to arrange the second data set (B) in a second sequence 46*b*, the second sequence 46*b* of the second data set (B) being an inverse of the first sequence 46*a* of the second data set (B), and the coordination information further comprises a request to transmit the second data set (B) in the second sequence 46*b* to the user terminal 7 after the first data set (A) has been transmitted. When the Serving Gateway 9 is the coordination component, as shown in FIG. 2, the processor 31 is further configured to arrange the second data set (B) in a second sequence 46*b*, the second sequence 46*b* of the second data set (B) being an inverse of the first sequence 46*a* of the second data set (B), and the coordination information further comprises a request to transmit the second data set (B) in the second sequence 46*b* to the user terminal 7 after the first data set (A) has been transmitted.

In the example of FIG. 4, the second base station 5 is configured to transmit at least part of a third data set (C) of data segments after the user terminal 7 has acknowledged receipt of the first data set (A), the third data set (C) comprising different data segments than the first data set (A) and the second data set (B). So if the transmission of the first data set (A) is finished, one of the base stations that transmitted the first data set (A), in this example the first base station 3, starts to transmit the second data set (B) being transmitted by the third base station 41, while the other base station that transmitted the first data set (A), in this example the second base station 5, progresses with a new, third data set (C).

When the first base station 3 is the coordination component, as shown in FIG. 1, the processor 11 is further configured to arrange a third data set (C) of data segments in a first sequence 47*a* and the coordination information sent to the second base station 5 further comprises a request to transmit the third data set (C) in the first sequence 47*a* to the user terminal 7 after the first data set (A) has been transmitted, the third data set (C) comprising different data segments than the first data set (A) and the second data set (B). When the Serving Gateway 9 is the coordination component, as shown in FIG. 2, the processor 31 is further configured to arrange a third data set (C) of data segments in a first sequence 47*a* and the coordination information sent to the second base station 5 further comprises a request to transmit the third data set (C) in the first sequence 47*a* to the user terminal 7 after the first data set (A) has been transmitted, the third data set (C) comprising different data segments than the first data set (A) and the second data set (B).

Similarly, when the user terminal 7 has completely received the second data set (B), the first base station 3 starts transmitting the third data set (C) in sequence 47b, which is the inverse of sequence 47a, which is being used by the second base station 5 to transmit the third data set (C). Furthermore, when the user terminal 7 has completely received the second data set (B), the third base station 41 starts transmitting a new, fourth data set (D) in sequence 48a in a normal order.

Figure 5:
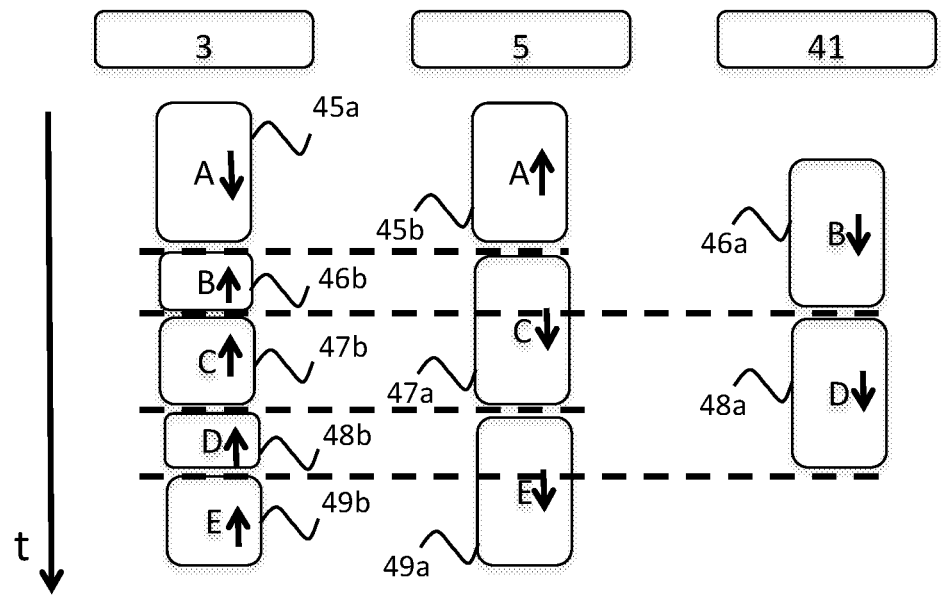
FIG. 5 illustrates a third example of sequences determined in a mobile communication system comprising three base stations.

FIG. 5 illustrates another example of sequences determined in a mobile communication system comprising three base stations. In this example, the third base station 41 is not available at the same time as the first base station 3 and the second base station 5, but becomes available later. This might be the result of the user terminal 7 moving closer to the third base station 41, for example. Similar to the example of FIG. 4, the third base station 41 starts transmitting at least part of a second data set (B) of data segments arranged in a first sequence 46a to the user terminal 7. In this example, it is again assumed that all base stations take turns transmitting with the same probability. As a result, the third base station 41 spends less time transmitting the second data set (B) in the example of FIG. 5 than in the example of FIG. 4. On the other hand, the first base station 3 spends more time transmitting the second data set (B) in the example of FIG. 5 than in the example of FIG. 4.

FIG. 5 further shows that when the user terminal 7 has completely received the third data set (C), the first base station 3 starts transmitting the fourth data set (D) in sequence 48b, which is the inverse of sequence 48a, which is being used by the third base station 41 to transmit the fourth data set (D). Furthermore, when the user terminal 7 has completely received the third data set (C), the second base station 5 starts transmitting a new, fifth data set (E) in sequence 49a in a normal order. Then, when the user terminal 7 has completely received the fourth data set (D), the first base station 3 starts transmitting the fifth data set (E) in sequence 49b, which is the inverse of sequence 49a, which is being used by the second base station 5 to transmit the fifth data set (E).

Figure 6:
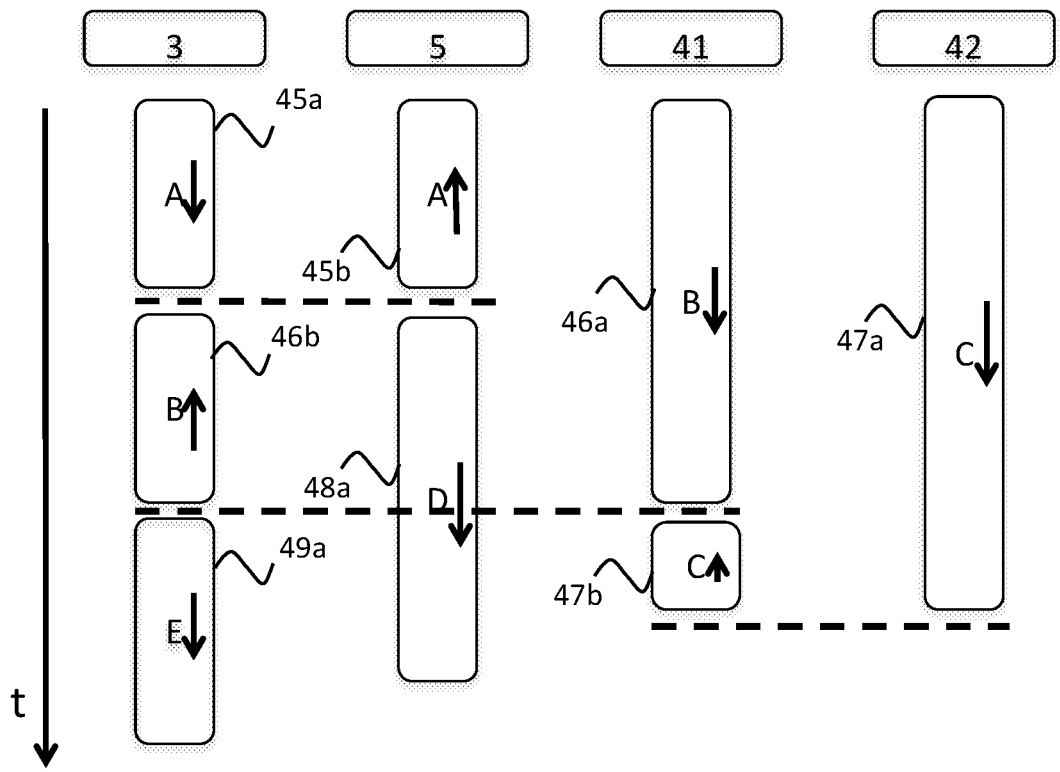
FIG. 6 illustrates a fourth example of sequences determined in a mobile communication system comprising four base stations.

FIG. 6 illustrates an example of sequences determined in a mobile communication system comprising a fourth base station 42 in addition to the first base station 3, the second base station 5 and the third base station 41. In the case of four base stations, it would be possible to group the base stations in two independent sets of two base stations each. However, it would be more beneficial to use all four base stations to transmit all data sets in a more efficient manner, extending the arrangement shown in the example of FIG. 5.

Preferably, every time two base stations are transmitting the same data set, the other two base stations are transmitting two different data sets, as shown in FIG. 6. As a result, when the first base station 3 and the second base station 5 are transmitting the first data set (A) in sequences 45a and 45b, the third base station 41 is transmitting a second data set (B) in sequence 46a and the fourth base station 42 is transmitting a third data set (C) in sequence 47a. The fourth base station is not transmitting the second data set (B) in an inverse of sequence 46a. Similarly, when the user terminal 7 has completely received the first data set (A), the first base station 3 starts transmitting the second data set (B) in a sequence 46b, which is an inverse of sequence 46a in which the third base station 41 is transmitting the second data set (B), but the second base station 5 starts transmitting the fourth data set (D) in sequence 48a instead of transmitting the third data set (C) in an inverse of sequence 47a, which is being used by the fourth base station 42 to transmit the third data set (C).

Similarly, when the user terminal 7 has completely received the second data set (B), the first base station 3 starts transmitting the fifth data set (E) in sequence 49a instead of transmitting the fourth data set (D) in an inverse of sequence 48a, which is being used by the second base station 5 to transmit the fourth data set (D). A drawback of this scheme is that it might increase latency. This is due to the fact that the user terminal 7 might not receive the data sets in sequential order. For example, if the first base station 3 and the third base station 41 both encounter a problem transmitting the second data set (B), the other base stations cannot assist with transmission until they are done transmitting their own data sets and the user terminal 7 might receive the third data set (C) from the fourth base station 42 before receiving the second data set (B) from the first base station 3 and/or the third base station 41.

Figure 7:
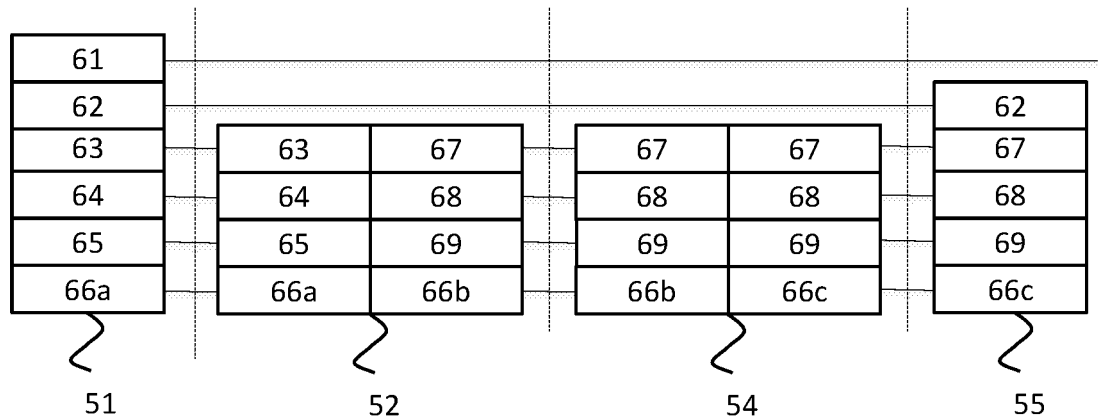
FIG. 7 shows a protocol implementation for use in a conventional mobile communication system.

FIG. 7 shows a current protocol implementation used in LTE. LTE uses PDCP protocol 63, RLC protocol 64, MAC protocol 65 and PHY/L1 protocol 66a between user equipment 51 and eNodeB 52. LTE uses PHY/L1 protocol 66b between eNodeB 52 and Serving Gateway 54 and PHY/L1 protocol 66c between Serving Gateway 54 and PDN Gateway 55. LTE uses GTP-U protocol 67, UDP protocol 68 and L2 protocol 69 between eNodeB 52 and Serving Gateway 54 and between Serving Gateway 54 and PDN Gateway 55. LTE further uses IP protocol 62 between user equipment 51 and PDN Gateway 55. Furthermore, an application layer 61 is shown is shown in FIG. 7 connecting user equipment 51 with an application running elsewhere, e.g. in the cloud.

Figure 8:
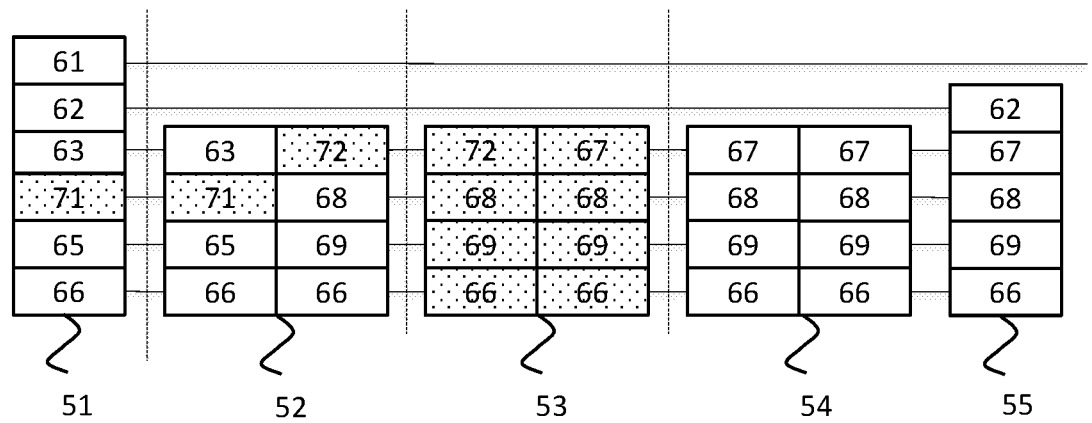
FIG. 8 shows a protocol implementation for use in the mobile communication system of the invention.

FIG. 8 shows a modified version of this LTE protocol implementation which facilitates the transmission of coordination information. Existing functionalities in eNB and S-GW nodes are re-used to provide CoMP with inverse data segment ordering. In addition to the entities shown in FIG. 7, FIG. 8 shows an additional coordination function 53. This coordination function 53 may be part of eNodeB 52 or Serving Gateway 54, for example. Alternatively, the coordination function 53 may be part of a different coordination component. In LTE, the GTP-U protocol 67 is responsible for delivering IP protocol 62 packets to the IP endpoint in the backhaul network (i.e. the eNodeB 52). In the modified protocol implementation of FIG. 8, the endpoint of the GTP-U protocol is the coordination function 53. This implies that if the coordination function 53 is located at the eNodeB 52, the endpoint of the GTP-U is the same as in FIG. 7. In case the coordination function 53 is located at the Server Gateway 54, the IP layer endpoint is moved from eNodeB 52 to the Server Gateway 54. In FIG. 8, the coordination function 53 and the eNodeB 52 communicate using a proposed new GTP-MT protocol 72, which is a version of the GTP-U protocol 67 modified for multipoint transmission to include coordination information. The eNodeB 52 and the user equipment 51 communicate using a proposed new MT-RLC protocol 71, which is a version of the RLC protocol 64 modified for multipoint transmission to include data set acknowledgements.

The afore-mentioned protocols are used to transfer payload data between applications. Data packets created in accordance with these protocols typically also have an additional overhead (bits or bytes), e.g. header and/or trailer bits, for the purpose of transporting the payload data. Examples of overhead comprise an indication of the data packet (e.g. a packet sequence number) and/or payload destination, of a (logical) channel, of a data packet and/or a payload length and/or an error check (e.g. CRC). For example, a data packet may comprise an Internet Protocol (IPv4, IPv6) datagram, possibly with additional overhead such as GTP overhead for tunneling the IP packet through part of the telecommunications network (e.g. from a Serving Gateway 54 to eNodeB 52), an RLC PDU and a Transport Block as e.g. used on a wireless (radio) connection between eNodeB 52 and user equipment 51. A data segment may correspond to a data packet, may comprise a fragment of a data packet or may comprise multiple data packets.

Coordination information sent to eNodeB 52 by the (CoMP) coordination function 53 may indicate the sequence in which data segments should be transmitted by referring to existing sequence numbers, e.g. PDCP protocol 63 or GTP-U protocol 67 sequence numbers. The coordination information may then indicate which existing sequence numbers are part of the same data set and in which sequence they should be transmitted. The eNodeB 52 can then use this coordination information and the existing sequence numbers of the received data packets to change the order in which the eNodeB 52 transmits the received data packets to the user equipment 51.

Figure 9:
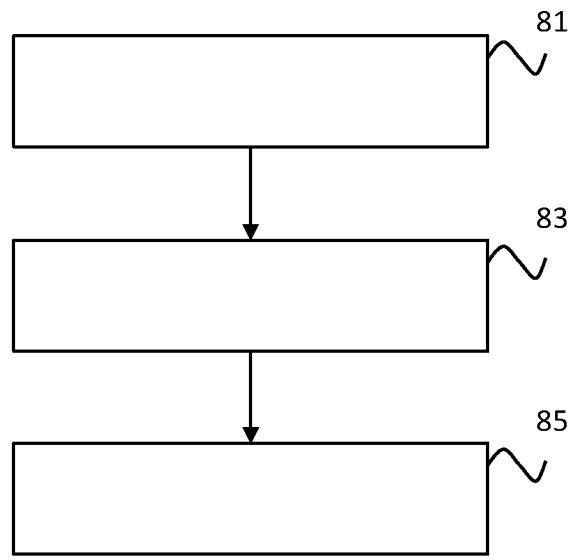
FIG. 9 is a flow diagram of the method of arranging data segments in sequences and of the invention.

The method of arranging data segments in sequences comprises three steps, see FIG. 9. A step 81 comprises arranging a first data set of data segments in a first sequence. A step 83 comprises arranging the first data set in a second sequence, the second sequence of the first data set being an inverse of the first sequence of the first data set. A step 85 comprises using a data transmitter to transmit coordination information to at least one base station, the coordination information comprising at least one of a request to transmit the first data set in the first sequence to a user terminal and a request to transmit the first data set in the second sequence to the user terminal. The method may be performed by a base station or by a different coordination component.

Figure 10:
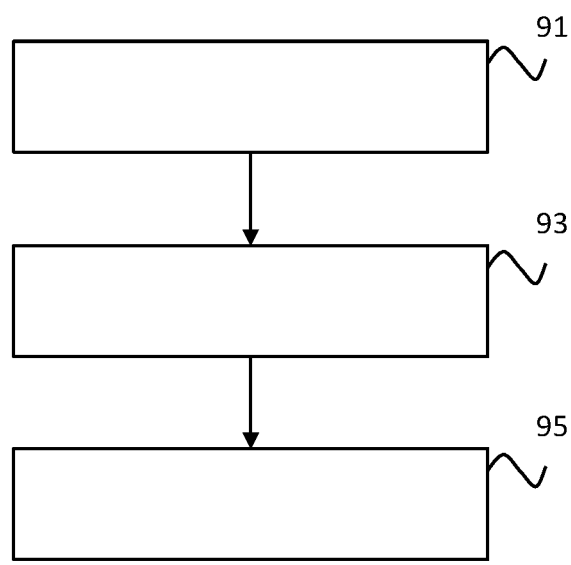
FIG. 10 is a flow diagram of the method of transmitting an acknowledgement of the invention.

The method of of transmitting an acknowledgement comprises three steps, See FIG. 10. A step 91 comprises using a data receiver to receive a first one of a plurality of data segments of a data set from a base station and/or a data segment acknowledgement acknowledging receipt of the first one of the plurality of data segments by a user terminal. A step 93 comprises using the data receiver to receive a last one of the plurality of data segments of the data set from the base station and/or a data set acknowledgement acknowledging receipt of the data set by the user terminal. A step 95 comprises using a data transmitter to transmit to a further base station a data set acknowledgment acknowledging receipt of the data set by the user terminal, while not transmitting to the further base station a data segment acknowledgment acknowledging receipt of the first one of the plurality of data segments by the user terminal. The method is preferably performed by a base station or a user terminal.

Figure 11:
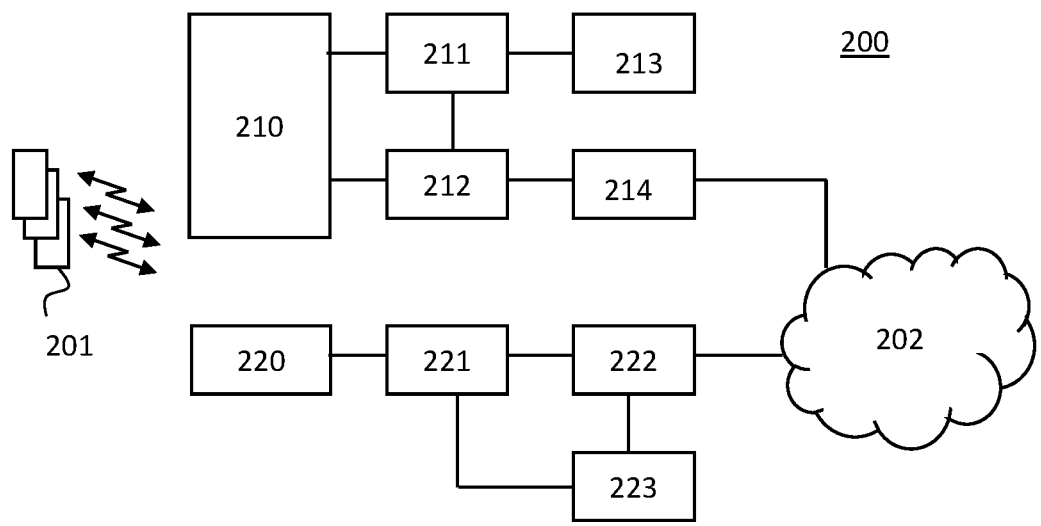
FIG. 11 is a block diagram of an exemplary cellular telecommunication system comprising the mobile communication system of the invention.

The mobile communication system 1 of FIG. 1 is preferably part of a cellular telecommunications system. FIG. 11 shows a schematic illustration of a cellular telecommunications system 200. The telecommunications system 200 comprises cellular radio access network systems 210 (E-UTRAN) and 220 (UT(RAN)) and a core network system containing various elements or nodes as described in further detail below.

In the telecommunications system 200 of FIG. 11, three generations of networks are schematically depicted together for purposes of brevity. A more detailed description of the architecture and overview can be found in 3GPP Technical Specification TS 23.002 'Network Architecture' which is included in the present application by reference in its entirety.

The lower branch of FIG. 11 represents a GSM/GPRS or UMTS network.

For a GSM/GPRS network, a radio access network (RAN) system 220 comprises a plurality of nodes, including base stations (combination of a BSC and a BTS), not shown individually in FIG. 11. The core network system comprises a Gateway GPRS Support Node 222 (GGSN), a Serving GPRS Support Node 221 (SGSN, for GPRS) or Mobile Switching Centre (MSC, for GSM, not shown in FIG. 11) and a Home Location Register 223 (HLR). The HLR 223 contains subscription information for user devices 201, e.g. mobile stations MS.

For a UMTS radio access network (UTRAN), the radio access network system 220 also comprises a Radio Network Controller (RNC) connected to a plurality of base stations (NodeBs), also not shown individually FIG. 11. In the core network system, the GGSN 222 and the SGSN 221/MSC are connected to the HLR 223 that contains subscription information of the user devices 201, e.g. user equipment UE.

The upper branch of the telecommunications system in FIG. 11 represents a next generation network, commonly indicated as Long Term Evolution (LTE) system or Evolved Packet System (EPS).

The radio access network system 210 (E-UTRAN), comprises base stations (evolved NodeBs, eNodeBs or eNBs), not shown individually in FIG. 11, providing cellular wireless access for a user device 201, e.g. a user equipment UE. The core network system comprises a PDN Gateway (P-GW) 214 and a Serving Gateway 212 (S-GW). The E UTRAN 210 of the EPS is connected to the S-GW 212 via a packet network. The S-GW 212 is connected to a Home Subscriber Server HSS 213 and a Mobility Management Entity MME 211 for signalling purposes. The HSS 213 includes a subscription profile repository SPR for user devices 201.

For GPRS, UMTS and LTE systems, the core network system is generally connected to a further packet network 202, e.g. the internet.

Further information of the general architecture of a EPS network can be found in 3GPP Technical Specification TS 23.401 'GPRS enhancements for Evolved Universal Terrestrial Radio Access Network (E-UTRAN) access'.

Figure 12:
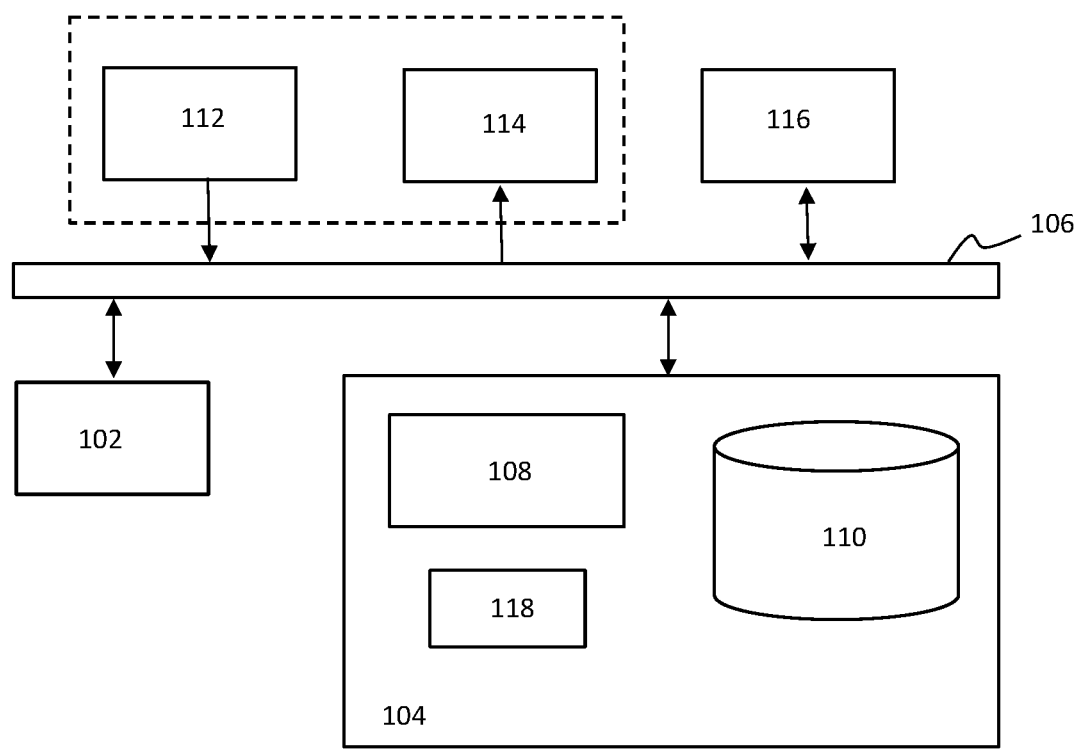
FIG. 12 is a block diagram of an exemplary data processing system for performing the method of the invention.

FIG. 12 depicts a block diagram illustrating an exemplary data processing system that may perform the methods as described with reference to FIGS. 9 and 10.

As shown in FIG. 12, the data processing system 100 may include at least one processor 102 coupled to memory elements 104 through a system bus 106. As such, the data processing system may store program code within memory elements 104. Further, the processor 102 may execute the program code accessed from the memory elements 104 via a system bus 106. In one aspect, the data processing system may be implemented as a computer that is suitable for storing and/or executing program code. It should be appreciated, however, that the data processing system 100 may be implemented in the form of any system including a processor and a memory that is capable of performing the functions described within this specification.

The memory elements 104 may include one or more physical memory devices such as, for example, local memory 108 and one or more bulk storage devices 110. The local memory may refer to random access memory or other non-persistent memory device(s) generally used during actual execution of the program code. A bulk storage device may be implemented as a hard drive or other persistent data storage device. The processing system 100 may also include one or more cache memories (not shown) that provide temporary storage of at least some program code in order to reduce the number of times program code must be retrieved from the bulk storage device 110 during execution.

Input/output (I/O) devices depicted as an input device 112 and an output device 114 optionally can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 12 with a dashed line surrounding the input device 112 and the output device 114). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 116 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 100, and a data transmitter for transmitting data from the data processing system 100 to said systems, devices and/or networks. Modems, cable modems, and Ethernet cards are examples of different types of network adapter that may be used with the data processing system 100.

As pictured in FIG. 12, the memory elements 104 may store an application 118. In various embodiments, the application 118 may be stored in the local memory 108, the one or more bulk storage devices 110, or separate from the local memory and the bulk storage devices. It should be appreciated that the data processing system 100 may further execute an operating system (not shown in FIG. 12) that can facilitate execution of the application 118. The application 118, being implemented in the form of executable program code, can be executed by the data processing system 100, e.g., by the processor 102. Responsive to executing the application, the data processing system 100 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 102 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

While this invention has been particularly shown and described with references to example embodiments thereof, it will be understood by those skilled in the art that various changes in form and details may be made therein without departing from the scope of the invention encompassed by the appended claims.

What is claimed is:

1. A mobile communication system, comprising:
   a first base station configured to transmit at least part of a first data set of data packets arranged in a first sequence to a user terminal;
   a second base station configured to transmit at the same time at least part of said first data set of the same data packets arranged in a second sequence to said user terminal, said second sequence of said first data set being an inverse of said first sequence of said first data set; and
   a third base station configured to transmit at the same time at least part of a second data set of data packets arranged in a first sequence to said user terminal, said second data set comprising different data packets than said first data set.

2. A mobile communication system as claimed in claim 1, wherein, for each of said first base station and said second base station, said base station is configured to detect that a user terminal has not received a previous transmission by said base station of at least part of a data packet and to retransmit said at least a part of said data packet to said user terminal upon said detection.

3. A mobile communication system as claimed in claim 1, wherein one of said first base station and said second base station is configured to transmit at least part of said second data set of data packets arranged in a second sequence after said user terminal has acknowledged receipt of said first data set, said first sequence of said second data set being an inverse of said second sequence of said second data set.

4. A mobile communication system as claimed in claim 3, wherein the other one of said first base station and said second base station is configured to transmit at least part of a third data set of data packets after said user terminal has acknowledged receipt of said first data set, said third data set comprising different data packets than said first data set and said second data set.

5. A coordination component for use in a mobile communication system of claim 1, comprising:
- a data transmitter; and
- a processor configured to arrange a first data set of data packets in a first sequence, to arrange said first data set of the same data packets in a second sequence, said second sequence of said first data set being an inverse of said first sequence of said first data set, and to use said data transmitter to transmit coordination information to at least one base station, said coordination information comprising at least one of a request to transmit said first data set in said first sequence to a user terminal and a request to transmit said first data set in said second sequence to said user terminal;
- wherein said processor is further configured to arrange a second data set of data packets in a first sequence, said second data set comprising different data packets than said first data set, and to use said data transmitter to transmit further coordination information to a further base station, said further coordination information comprising one of a request to transmit said first data set in said first sequence to said user terminal, a request to transmit said first data set in said second sequence to said user terminal, and a request to transmit said second data set in said first sequence to said user terminal.

6. A coordination component as claimed in claim 5, wherein said processor is further configured to arrange said second data set of data packets in a second sequence, said second sequence of said second data set being an inverse of said first sequence of said second data set, and said coordination information further comprises a request to transmit said second data set in said second sequence to said user terminal after said first data set has been transmitted.

7. A coordination component as claimed in claim 5, wherein said processor is further configured to arrange a third data set of data packets in a first sequence and said coordination information further comprises a request to transmit said third data set in said first sequence to said user terminal after said first data set has been transmitted, said third data set comprising different data packets than said first data set and said second data set.

8. A user terminal for use in a mobile communication system of claim 1, comprising:
- a data receiver;
- a data transmitter; and
- a processor configured to use said data receiver to receive a first one of a plurality of data packets of a data set from a base station, to use said data transmitter to transmit a data packet acknowledgment acknowledging receipt of said first one of said plurality of data packets to said base station, to use said data receiver to receive a last one of said plurality of data packets of said data set from said base station, to use said data transmitter to transmit a data set acknowledgement acknowledging receipt of said data set to said base station and to a further base station and not to transmit said data packet acknowledgment to said further base station;
- wherein said processor is further configured to use said data receiver to switch to receiving data packets from said further base station instead of said base station in dependence on at least one of reception conditions and load conditions with respect to said base station and said further base station.

* * * * *